(12) United States Patent
Gao et al.

(10) Patent No.: US 6,852,438 B2
(45) Date of Patent: Feb. 8, 2005

(54) EMBOSSED CURRENT COLLECTOR SEPARATOR FOR ELECTROCHEMICAL FUEL CELL

(75) Inventors: Yunzhi Gao, Saitama-ken (JP); Akira Kunimoto, Saitama-ken (JP)

(73) Assignee: Kabushiki Kaisha Riken, Tokyo (JP)

( * ) Notice: Subject to any disclaimer, the term of this patent is extended or adjusted under 35 U.S.C. 154(b) by 223 days.

(21) Appl. No.: 09/865,601

(22) Filed: May 29, 2001

(65) Prior Publication Data

US 2002/0009630 A1 Jan. 24, 2002

(30) Foreign Application Priority Data

May 26, 2000 (JP) .......................... 2000-157189
Jun. 6, 2000 (JP) .......................... 2000-169559

(51) Int. Cl.[7] .............................. H01M 2/00; H01M 2/14
(52) U.S. Cl. ............................ 429/34; 429/38; 427/115
(58) Field of Search ........................... 429/34, 35, 36, 429/210, 38; 428/586, 594, 615, 650, 469, 472.2, 548, 547, 613; 204/254, 253, 256; 427/115

(56) References Cited

U.S. PATENT DOCUMENTS

| 5,482,792 A | * | 1/1996 | Faita et al. .................... 429/30 |
| 5,733,682 A | * | 3/1998 | Quadakkers et al. ......... 429/210 |
| 2002/0034672 A1 | * | 3/2002 | Saito et al. .................... 429/34 |

FOREIGN PATENT DOCUMENTS

| JP | 08-171892 | * | 7/1996 | ............ H01M/2/16 |
| JP | 2000-323151 |  | 11/2000 | |

* cited by examiner

*Primary Examiner*—Raymond Alejandro
(74) *Attorney, Agent, or Firm*—Browdy and Neimark, P.L.L.C.

(57) ABSTRACT

A bipolar current collector separator for a fuel cell composed of a metal plate having flow channels and contact faces that come into contact with electrodes or collectors, wherein a corrosion-resistant layer such as an anodized aluminum layer and a heat-resistant polymer layer is disposed on each of the flow channels.

12 Claims, 8 Drawing Sheets

EMBOSSED CURRENT COLLECTOR SEPARATOR FOR ELECTROCHEMICAL FUEL CELL

BACKGROUND OF THE INVENTION

The present invention relates to a bipolar current collector separator for a fuel cell, particularly to a separator applicable to an on-vehicle fuel cell for an automobile.

Fuel cells have attracted much attention as next generation electric generators because they are excellent in energy conversion efficiency and discharge no harmful or toxic substances. In particular, fuel cells using a solid polymer electrolyte membrane (hereinafter referred to as "PEM") that work at 150° C. or less have been studied actively and expected to be made practicable a few years later. The fuel cells using PEM can work at a relatively low temperature, be high in output density of electric generation, and be miniaturized, thereby suitable for domestic or on-vehicle fuel cells.

In general, the fuel cell using the PEM is produced by disposing the PEM between a fuel electrode and an oxygen/air electrode to prepare a cell, and by stacking a plurality of the cells with each other through plate-shaped separators having flow channels for supplying fuel gas and air. Used as the PEM is generally an ion exchange membrane of a fluororesin having a sulfonic acid group, etc., and the fuel electrode and the oxygen electrode are generally made of carbon black in which a water repellent material such as PTFE and a catalyst such as a noble metal fine particle are dispersed, etc.

When a hydrogen-oxygen fuel cell works, protons provided by oxidation of hydrogen gas penetrate into a fuel electrode (anode) and combine with water molecules therein to form $H_3O^+$, and the resultant $H_3O^+$ moves to an air electrode (cathode). In the cathode, oxygen supplied through flow channels obtains electrons provided by oxidation of hydrogen gas, and combines with protons in the electrolyte to provide water. These processes are repeated to obtain electric energy continuously. Although the theoretical electromotive force of the hydrogen-oxygen fuel cell is 1.2 V, the actual output voltage is approximately 0.6 to 0.8 V because of voltage drop due to polarization of the electrode, crossover of the reaction gas where the fuel gas leaks to the cathode through the electrolyte, contact resistance of the electrode and the collector, etc. Accordingly, to obtain the practical output voltage, it is necessary to stack dozens of cells through the separators and connect the stacked cells in series.

As known from the above-mentioned principle of electric generation, $H^+$ exists in the electrolyte in large amounts, so that the inside of the electrolyte and the neighborhood of the electrodes where water or water vapor exists in large amounts are strongly acidic. Further, although oxygen combines with $H^+$ to provide water in the cathode, hydrogen peroxide may be often provided depending on the working conditions. The separators are used under such circumstances, thereby required to have high chemical stability and electrochemical stability (corrosion resistance) in addition to electric conductivity and air-tightness.

Most of the conventional separators have been produced by machining a graphite plate. Although the graphite separators are low in electric resistance and high in corrosion resistance, they are poor in mechanical strength and high in machining cost. Thus, it is difficult to utilize the conventional graphite separators as the separator for the on-vehicle fuel cells, which is required to be high in the mechanical strength and low in the machining cost. Recently proposed is a separator that is produced by mixing graphite powder with a resin, and by injection-molding and baking the resulting mixture, however, there is a problem that it is low in density to be poor in the air-tightness. Although the density can be increased by impregnating the separator with a resin and by burning the resultant again to carbonize it, this results in complicated manufacturing processes. In addition, thus-produced separator has the contact electric resistance several times higher than that of the conventional graphite separator, whereby the fuel cell using this separator inevitably to the output voltage.

Metal separators have also been studied in addition to the graphite separators. The metal separators are low in bulk electric resistance, high in air-tightness and mechanical strength, and can be easily produced with reduced working cost. Further, the metal separators can be thinned and miniaturized with ease, and the weight of a fuel cell using the metal separator can be reduced if the metal separator is made of a light metal such as aluminum. However, there is a problem that the metal material is liable to corrode, in particular, it has been known that aluminum exhibits extremely high corrosion rate (R. L. Rorup et al., Mater. Res. Soc. Symp. Proc., 393 (1995), etc.). Further, there is a fear that metal ions generated by corrosion of the metal material penetrate into the electrolyte membrane to reduce the ion-conductivity thereof.

Japanese Patent Laid-Open No. 11-162478 has disclosed that the corrosion resistance of the metal separator can be improved by plating entire surfaces thereof with a noble metal. Although this metal separator plated with a noble metal sufficiently acts as a separator, it necessitates high production cost to be far from practicable. To reduce the production cost, a noble metal layer should be thinned. However, when a thinner noble metal layer is disposed by wet plating methods, the resultant layer has fine pinholes that cause corrosion of the metal separator. On the other hand, dry plating methods such as vapor deposition methods and sputtering methods are poor in efficiency of producing the thinner noble metal layer, and the resultant layer is poor in uniformity.

OBJECT AND SUMMARY OF THE INVENTION

An object of the present invention is to provide a metal bipolar current collector separator for a fuel cell excellent in corrosion resistance.

As a result of intense research in view of the above object, the inventors have found that corrosion resistance of a metal bipolar current collector separator for a fuel cell can be improved by disposing a corrosion-resistant layer on a small part thereof. The present invention has been accomplished by the finding.

Thus, a bipolar current collector separator for a fuel cell of the present invention is composed of a metal plate having flow channels and contact faces that come into contact with electrodes or collectors, wherein a corrosion-resistant layer is disposed on each of the flow channels.

According to the bipolar current collector separator of the present invention, the corrosion-resistant layer is preferably an anodized aluminum layer or a heat-resistant polymer layer. Hereinafter, the bipolar current collector separator having the anodized aluminum layer as the corrosion-resistant layer is referred to as "first separator", and the bipolar current collector separator having the heat-resistant polymer layer as the corrosion-resistant layer is referred to as "second separator".

In the first separator, the metal plate is made of aluminum or an aluminum alloy. The anodized aluminum layer is preferably composed of a dense anodized aluminum layer having a porosity of less than 5%. In this case, the dense anodized aluminum layer preferably has a thickness of 5 to 50 µm. It is also preferred that the anodized aluminum layer is composed of a dense anodized aluminum layer having a porosity of less than 5%, and a porous anodized aluminum layer having a porosity of 5% or more provided on the dense anodized aluminum layer. Aluminum composing the metal plate preferably has a purity of 99.5% or more. A corner portion formed between surfaces of the flow channel is preferably in the shape of a curved surface having a curvature radius of 0.5 mm or more. Further, a corner portion formed between a side surface of the flow channel and the contact face is preferably in the shape of a curved surface having a curvature radius of 0.3 mm or more.

In the second separator, the heat-resistant polymer layer is preferably water repellent, and preferably made of a polymer material selected from the group consisting of vinyl resins, polyvinyl chloride, polytetrafluoroethylene, polyvinylidene fluoride, aromatic polyamides, polyimides, polycarbonates, polybutylene terephthalate, polyethylene terephthalate, polyesters, polystyrene, copolymers of styrene and another monomer, polyethylene, polypropylene, polyurethanes, silicone resins, polysulfones, polyethersulfones, rayon, cupra, acetate resins, promix, vinylon, vinylidene resins, acrylic resins and derivatives thereof. The heat-resistant polymer layer preferably has a multi-layered structure comprising two or more layers. The metal plate in the second separator is preferably made of aluminum or an aluminum alloy, in his case, it is preferable that an anodized aluminum layer is provided on the flow channel and the heat-resistant polymer layer is further disposed on the anodized aluminum layer. The anodized aluminum layer is preferably composed of a porous anodized aluminum layer having a porosity of 5% or more. It is also preferable that the anodized aluminum layer is composed of a dense anodized aluminum layer having a porosity of less than 5%, and a porous anodized aluminum layer having a porosity of 5% or more provided on the dense anodized aluminum layer. Aluminum composing the metal plate preferably has a purity of 99.5% or more.

On the contact face of the bipolar current collector separator of the present invention is preferably disposed a conductive film. The conductive film is particularly preferably made of a metal selected from the group consisting of Pt, Au, Pd, Ru, Rh, Ir, Ag, mixtures thereof and alloys composed thereof; carbon; or a conductive carbide.

DETAILED DESCRIPTION OF THE PREFERRED EMBODIMENTS

A bipolar current collector separator for a fuel cell of the present invention is composed of a metal plate having flow channels and contact faces of land that come into contact with electrodes or collectors. On each of the flow channels is disposed a corrosion-resistant layer. The bipolar current collector separator of the present invention can be suitably used in various fuel cells, particularly in on-vehicle fuel cells for automobiles.

The corrosion-resistant layer is preferably an anodized aluminum layer or a heat-resistant polymer layer from the viewpoints of corrosion resistance and production costs. While the first separator having the anodized aluminum layer and the second separator having the heat-resistant polymer layer will be explained in detail below with reference to FIGS. 1 to 8, the present invention is not restricted thereto and any modifications may be made therein unless they deviate from the scope of the present invention defined in the claims attached hereto.

[1] First Separator

A first separator of the present invention is composed of a metal plate of aluminum or an aluminum alloy, which has flow channels and contact faces (conductive faces) that come into contact with electrodes or collectors. On each of the flow channels, which do not come into contact with electrodes, etc., is disposed the anodized aluminum layer as the corrosion-resistant layer to increase the corrosion resistance. The first separator is substantially made of aluminum or an aluminum alloy, to be light in weight and exhibit improved electrical conductivity and vibration resistant.

Figure 1:
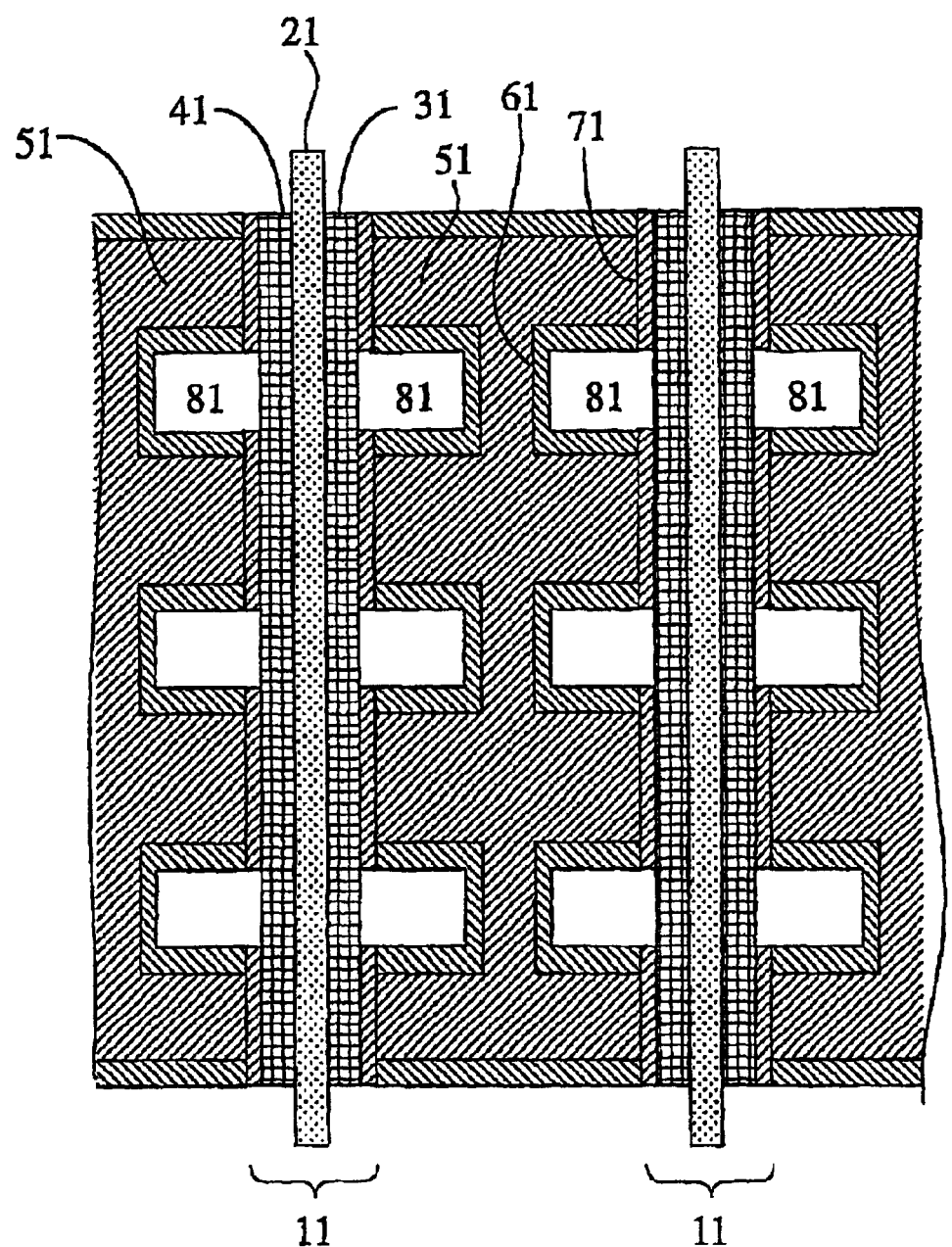
FIG. 1 is a fragmentary schematic view showing an example of a fuel cell using a first separator of the present invention.
Figure 2:
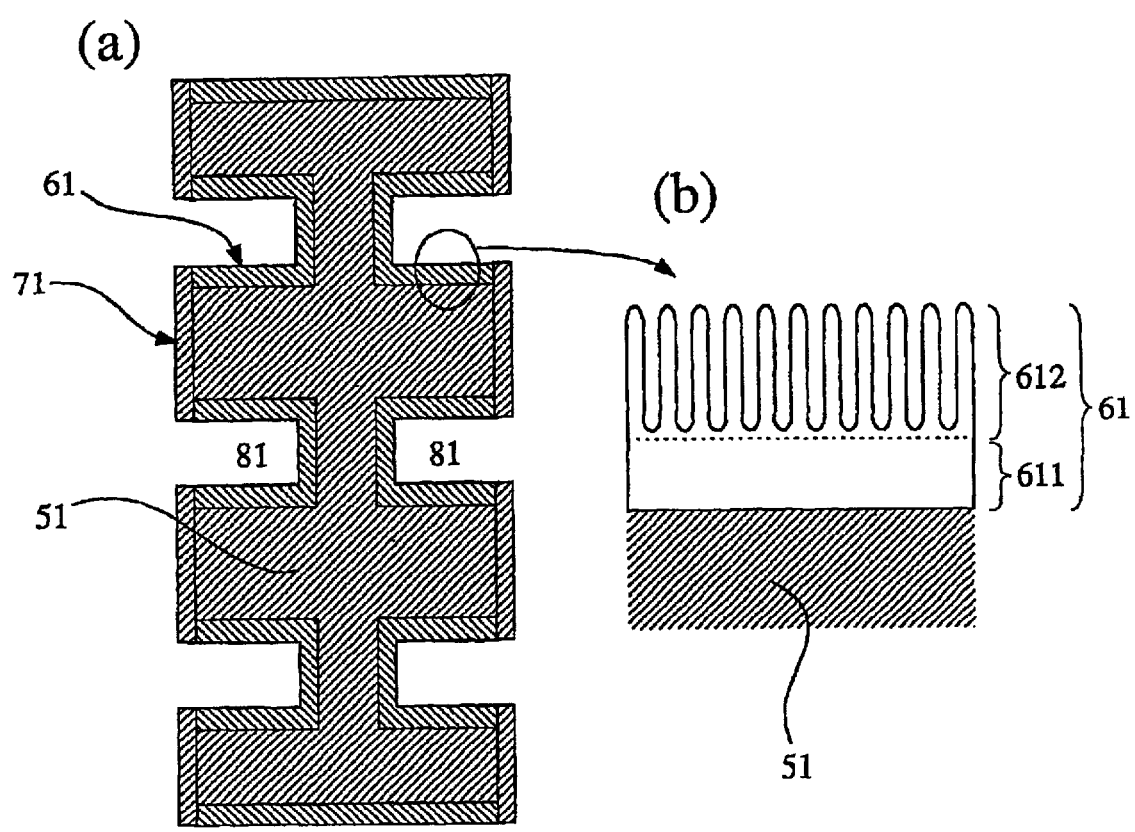
FIG. 2(a) is a schematic view showing an embodiment of a first separator of the present invention.
FIG. 2(b) is a fragmentary enlarged view showing an anodized aluminum layer of the first separator of FIG. 2(a)

FIG. 1 is a fragmentary schematic view showing an example of a fuel cell using a first separator of the present invention. The fuel cell of FIG. 1 is constituted by the respective stacking cells, 11, through a first separator 51, each cell 11 being prepared by disposing a solid electrolyte 21 between an anode 31 and a cathode 41. Both ends of the stack are generally connected to an external circuit (not shown).

As shown in FIG. 1, the first separator 51 has flow channels 81. A fuel gas is supplied through passages each formed by the flow channel 81 and the anode 31, and an oxidizing gas is supplied through passages each formed by the flow channel 81 and the cathode 41. On each of the flow channels 81 is disposed an anodized aluminum layer 61 that is chemically and physically stable. Further, a conductive film 71 is preferably disposed on each of the contact faces as shown in FIG. 1.

Although the cross section of the flow channel 81 of FIG. 1 is in C-shape, the flow channel has no particular limitation on the shape thereof if only the shape is such that the flow channel can form the above passage. The flow channel preferably has such a shape that the flow resistance of the reaction gas is reduced and that the electric generation efficiency is increased. Generally, the depth of the flow channel is preferably 0.2 to 2 mm, and the width thereof is preferably 0.5 to 5 mm. The flow channel may be formed into a predetermined pattern by machining, pressing, precision casting, chemical polishing (etching), electro-polishing, etc. The shape of the contact face is not restricted by FIG. 1, and the contact face may has any shape if only the contact face can suitably come in contact with a carbon paper, carbon cloth, etc. of the electrodes or the primary collectors in the fuel cell.

The anodized aluminum layer may be disposed by an anode oxidation method, etc. For example, the metal plate of aluminum or an aluminum alloy may be subjected to electrolysis using an electrolytic solution of an aqueous solution comprising oxalic acid, sulfuric acid, chromic acid, etc., to provide a γ-alumina layer thereon. A hard, dense anodized aluminum layer may be disposed by appropriately selecting anode oxidation conditions, thereby further increasing the corrosion resistance of the first separator. The first separator is preferably treated with boiling water or water vapor after the anode oxidation to close fine pores of the anodized aluminum layer, thereby further improving the corrosion resistance thereof.

The anodized aluminum layer of the first separator is preferably composed of a dense anodized aluminum layer having a porosity of less than 5%. In this case, a thickness of the dense anodized aluminum layer is preferably 5 to 50 $\mu$m, more preferably 10 to 30 $\mu$m.

The anodized aluminum layer may have fine vertical pores, or may be composed of a sponge-like porous layer. As shown in FIGS. 2(a) and 2(b), in the first separator of the present invention, it is also preferred that the anodized aluminum layer 61 is composed of a dense anodized aluminum layer 611 and a porous anodized aluminum layer 612 provided thereon to maintain the corrosion resistance for a long period. The porosity of the dense anodized aluminum layer is preferably less than 5%, and the porosity of the porous anodized aluminum layer is preferably 5% or more, more preferably 10% or more. In this case, the dense anodized aluminum layer preferably has the thickness of 2 to 30 $\mu$m, the porous anodized aluminum layer preferably has the thickness of 5 to 50 $\mu$m. The anodized aluminum layer is often swelled and strained by water vapor to be cracked or peeled off, whereby the corrosion resistance thereof seems reduced. In the first separator of the present invention, the strain may be moderated by the porous anodized aluminum layer mentioned above.

In the case where the metal plate of aluminum contains a large amount of impurities, the anodized aluminum layer disposed thereon is poor in uniformity and low in density. In such a case, the fine pores of the anodized aluminum layer are not sufficiently closed by the densification treatment using boiling water or water vapor. Accordingly, the purity of aluminum composing the first separator of the present invention is preferably 99.5% or more, more preferably 99.9% or more. Further, although there is no particular limitation on the thickness of the metal plate, it is preferably 0.5 to 3 mm when the first separator is used for the on-vehicle fuel cell.

As described above, the conductive film is preferably disposed on each of the contact faces that come into contact with electrodes or collectors. Thus, the whole surface of the first separator according to the present invention is preferably covered with the combination of the non-conductive anodized aluminum layer and the conductive film.

The conductive film is preferably made of an electrically conductive material having a high corrosion resistance, and particularly preferably made of: a metal selected from the group consisting of Pt, Au, Pd, Ru, Rh, Ir, Ag, mixtures thereof and alloys composed thereof; carbon; or a conductive carbide. The conductive film of a noble metal such as Au, Ag, Pt, Pd, etc. is low in the contact resistance and excellent in the corrosion resistance. The conductive film of carbon is preferably a graphite film provided by CVD, a DLC film (diamond-like carbon film), etc. Further, the conductive film may be disposed by applying a graphite powder containing a water repellent agent to the contact face. The conductive film of carbon can conformably come into contact with the electrode made of carbon black and a slight amount of Pt. The conductive carbide used for the conductive film is preferably silicon carbide, niobium carbide, tungsten carbide, etc. The conductive film of the conductive carbide has a low contact resistance, and excellent corrosion resistance and oxidation resistance, to also act as a protective film of the first separator.

The conductive film may be disposed by a sputtering method, an electroplating method, a wet plating method, a CVD method, etc. The conductive film preferably has a thickness of 0.01 to 5 $\mu$m. When the thickness is less than 0.01 $\mu$m, the conductive film is poor in strength to be unstable. On the other hand, the conductive film having a thickness of more than 5 $\mu$m results in high cost.

When the first separators are integrated into the fuel cell, they are generally compressed in a stacking direction under a surface pressure of approximately 1 to 10 kg/cm$^2$, to improve the air-tightness of the fuel cell, and to sufficiently make the contact faces come into contact with the electrodes or the collectors.

Figure 3:
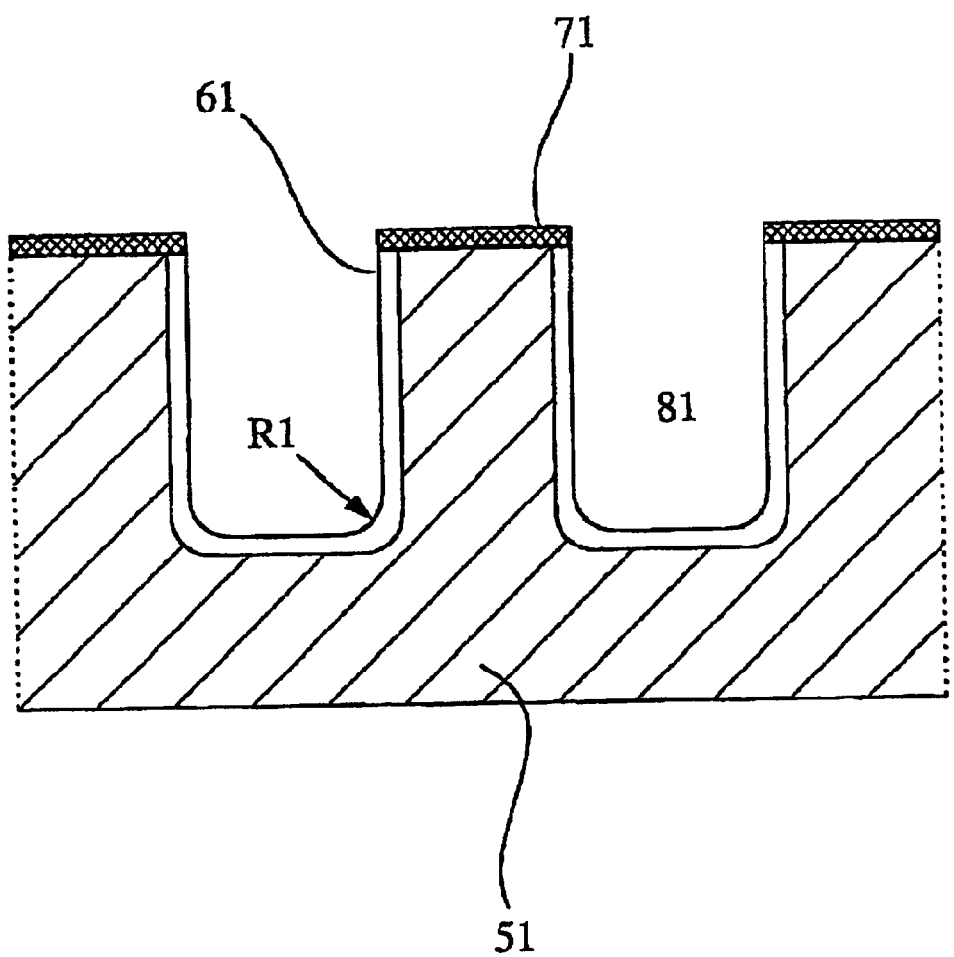
FIG. 3 is a fragmentary schematic view showing an example of a flow channel according to a first separator of the present invention.

The fuel cell generally works at approximately 80 to 120° C., and the first separator in the fuel cell may be deformed by thermal expansion at such a temperature. In particular, there is a case where the anodized aluminum layer is cracked or damaged by deformation of the separator at a portion to which a large stress is applied, thereby remarkably reduced with respect to the corrosion resistance. Thus, in the first separator of the present invention, a corner portion formed between surfaces of the flow channel 81, which is shown as R1 in FIG. 3, is preferably in the shape of a curved surface to relax the stress. The curvature radius of the curved surface is preferably 0.5 mm or more, more preferably 1.0 mm or more.

Figure 4:
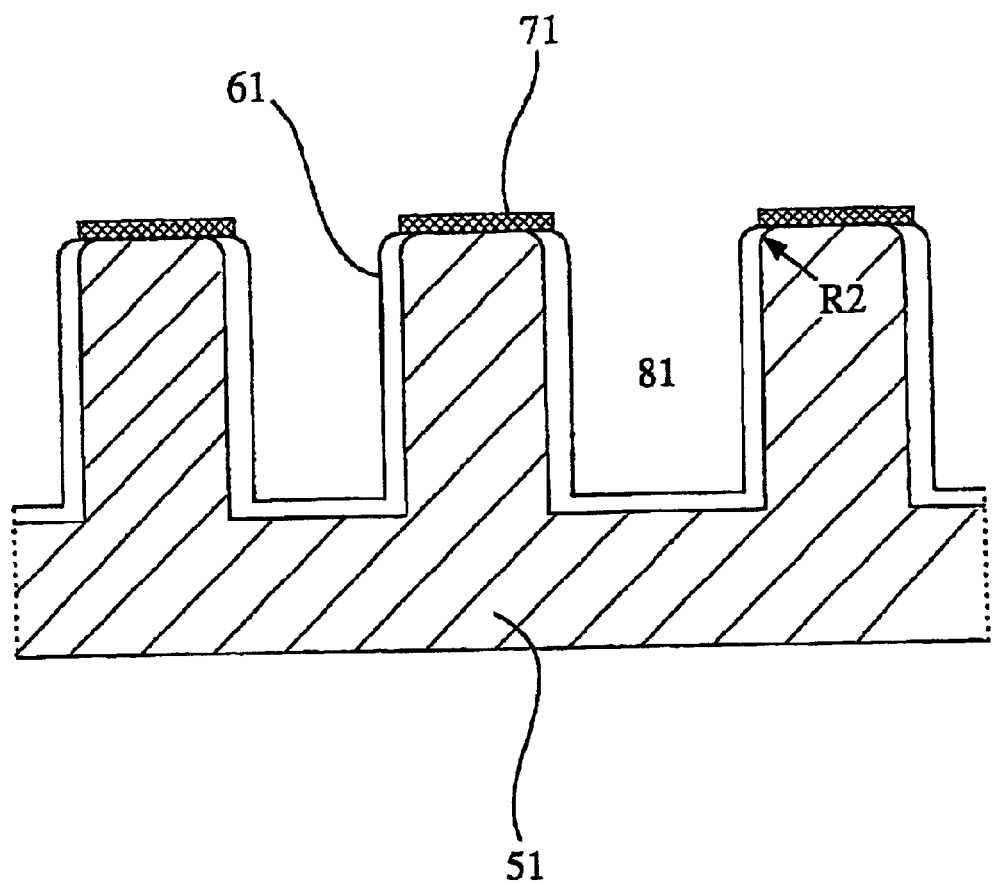
FIG. 4 is a fragmentary schematic view showing another example of a flow channel according to a first separator of the present invention.

To a boundary between the anodized aluminum layer and the conductive film is often intensively applied the stress. Further, the anodized aluminum layer and the conductive film grow vertically to the metal plate, not laterally, so that the anodized aluminum layer is easily damaged at the boundary. Thus, in the first separator of the present invention, a corner portion formed between a side surface of the flow channel 81 and the contact face, which is shown as R2 in FIG. 4, is preferably in the shape of a curved surface. The curvature radius of the curved surface is preferably 0.3 mm or more, more preferably 0.5 mm or more. In the first separator having such a curved surface, the anodized aluminum layer is sufficiently prevented from swelling and straining.

[2] Second Separator

The second separator of the present invention is composed of a metal plate having flow channels and contact faces that come into contact with electrodes or collectors. On each of the flow channels, which do not come into contact with electrodes, etc., is disposed the heat-resistant polymer layer as the corrosion-resistant layer to increase the corrosion resistance of the second separator.

Figure 5:
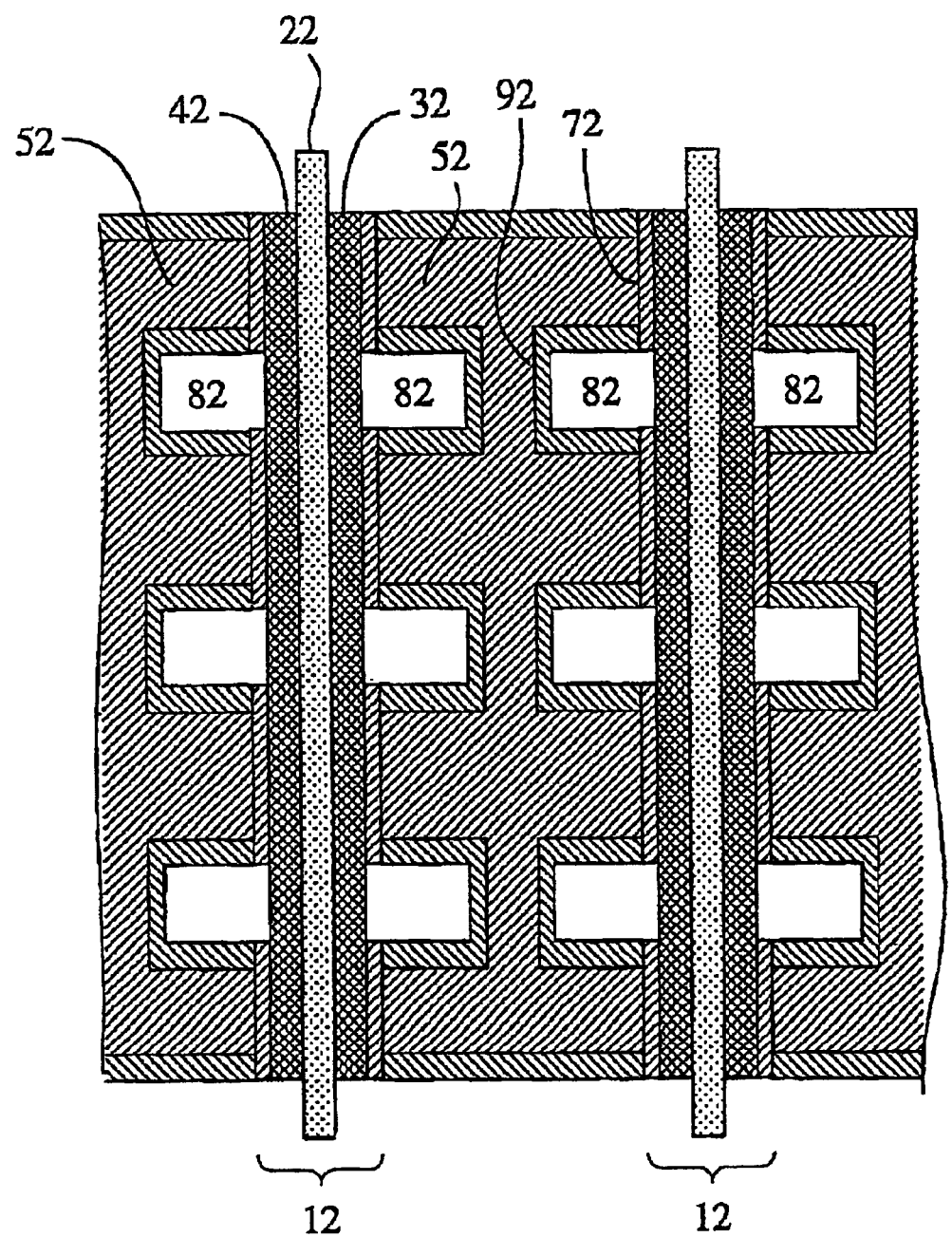
FIG. 5 is a fragmentary schematic view showing an example of a fuel cell using a second separator of the present invention.
Figure 6:
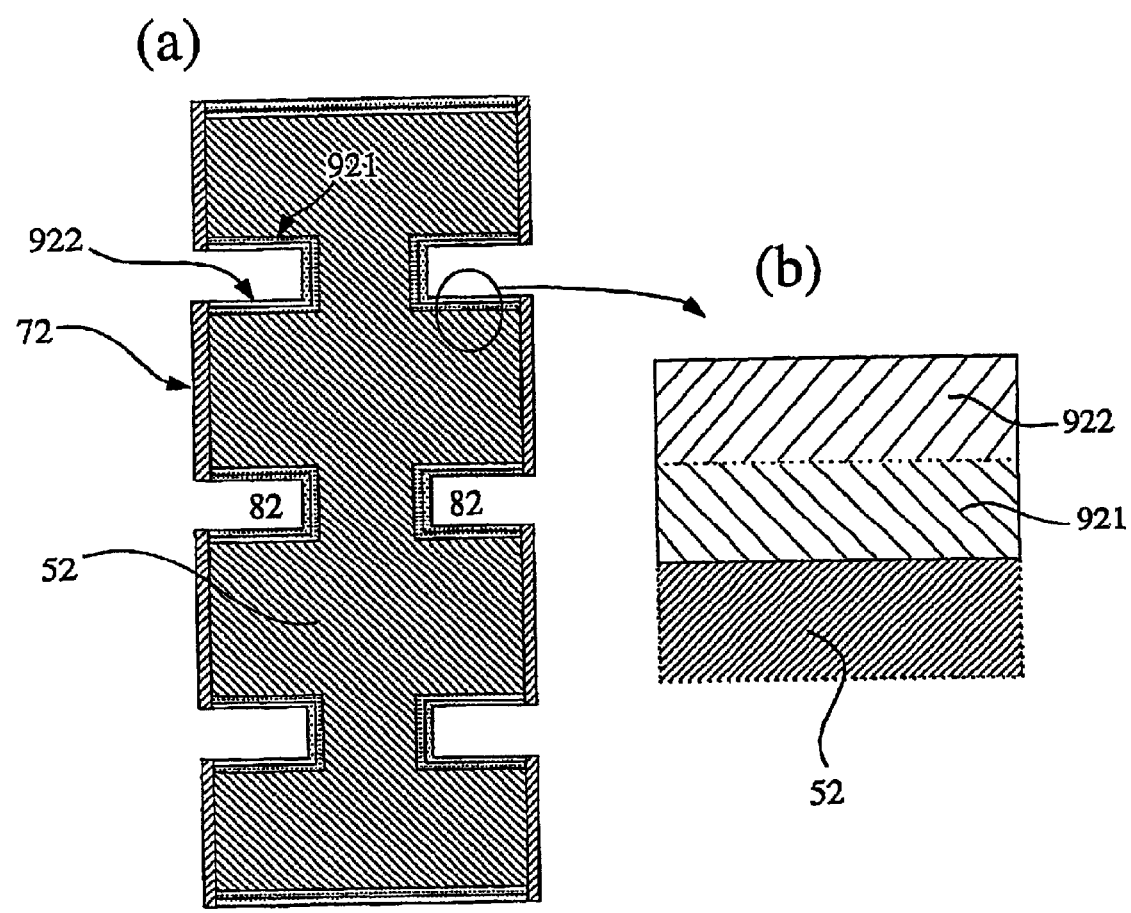
FIG. 6(a) is a schematic view showing an embodiment of a second separator of the present invention.
FIG. 6(b) is a fragmentary enlarged view showing a heat-resistant polymer layer of the second separator of FIG. 6(a)
Figure 7:
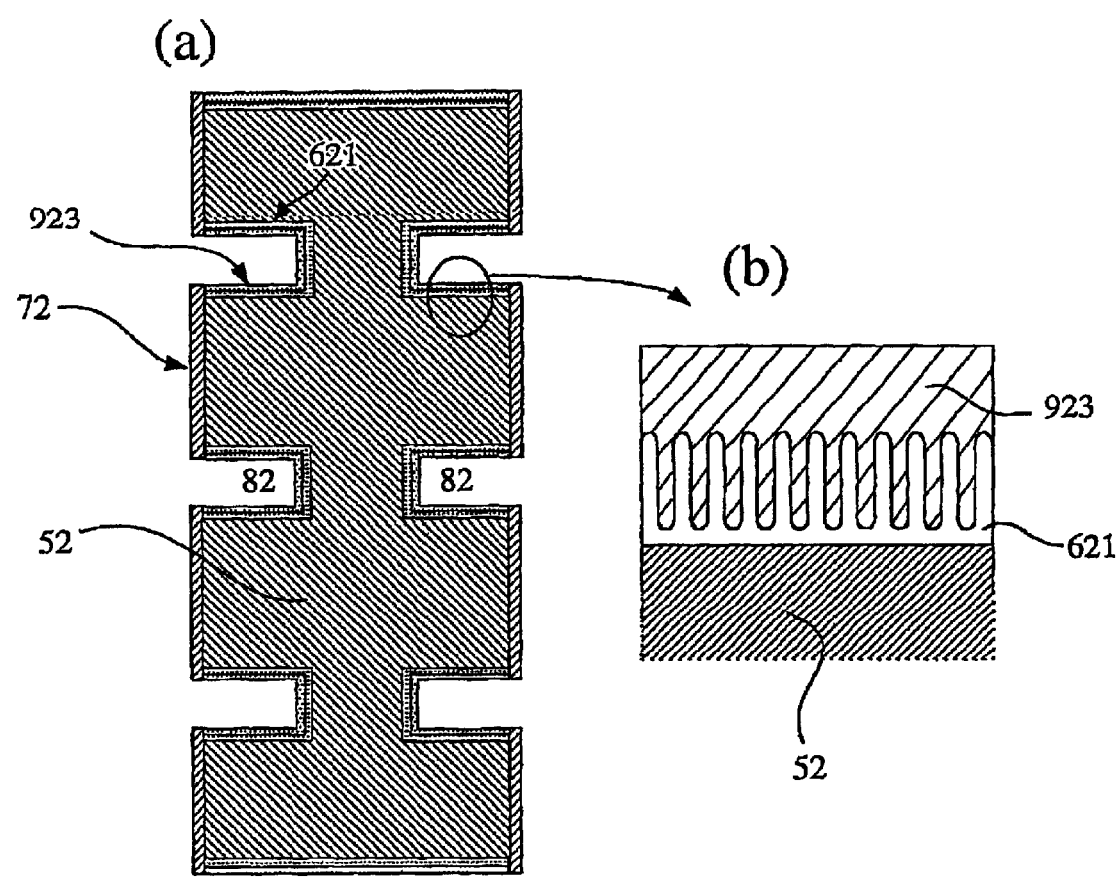
FIG. 7(a) is a schematic view showing another embodiment of a second separator of the present invention.
FIG. 7(b) is a fragmentary enlarged view showing a heat-resistant polymer layer and an anodized aluminum layer of the second separator of FIG. 7(a)
Figure 8:
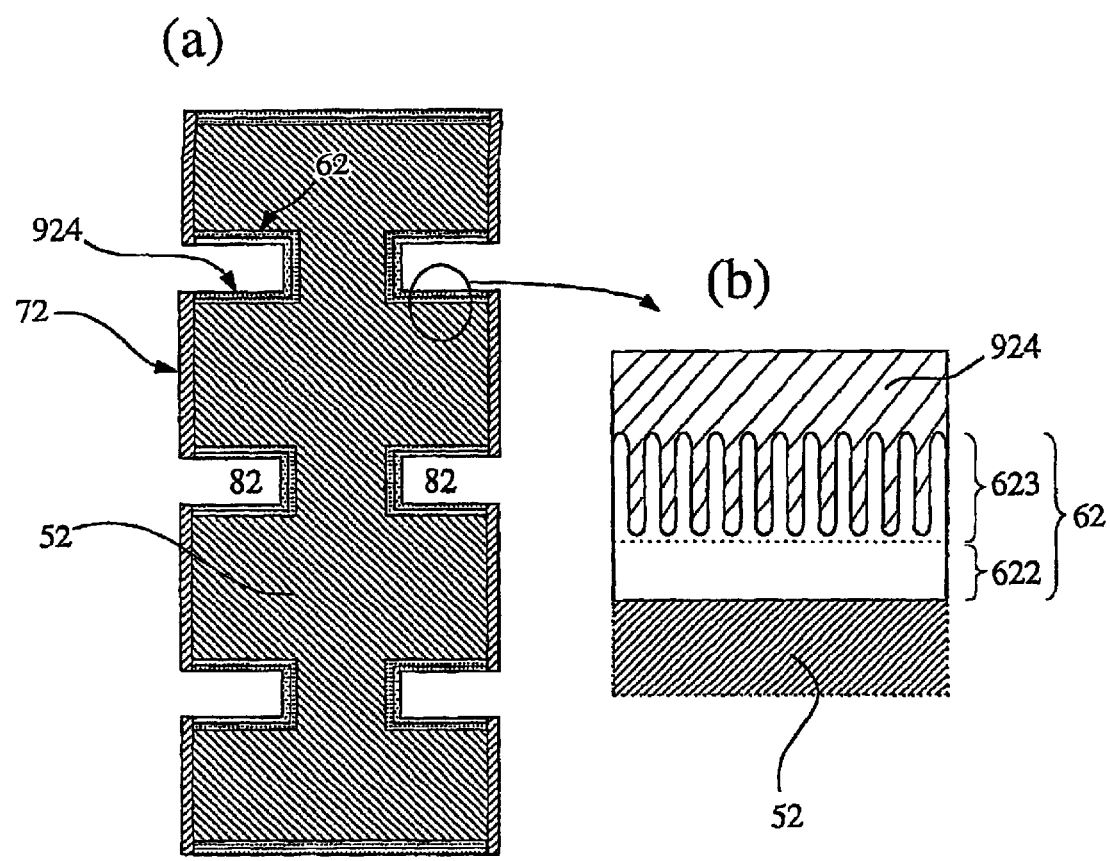
FIG. 8(a) is a schematic view showing another embodiment of a second separator of the present invention.
FIG. 8(b) is a fragmentary enlarged view showing a heat-resistant polymer layer and an anodized aluminum layer of the second separator of FIG. 8(a).

FIG. 5 is a fragmentary schematic view showing an example of a fuel cell using the second separator of the present invention. The fuel cell of FIG. 5 is constituted by the respective stacking cells, 12, through a second separator 52, each cell 12 being prepared by disposing a solid electrolyte 22 between an anode 32 and a cathode 42. Both ends of the stack are generally connected to an external circuit (not shown).

As shown in FIG. 5, the second separator 52 has flow channels 82. A fuel gas is supplied through passages each formed by the flow channel 82 and the anode 32, and an oxidizing gas is supplied through passages each formed by the flow channel 82 and the cathode 42. On each of the flow channels 82 is disposed a heat-resistant polymer layer 92. Further, a conductive film 72 is preferably disposed on each of the contact faces as shown in FIG. 5.

In the second separator, the preferred embodiments of the shape, the depth, the width and the forming method of the flow channel are the same as those in the first separator. Further, the shape of the contact face is not restricted by FIG. 5, and the contact face may has any shape if only the contact face can suitably come in contact with a carbon paper, carbon cloth, etc. of the electrodes or the primary collectors.

It is preferred that the heat-resistant polymer layer has a dense structure. The term "dense structure" as used herein means such a structure that water or a gas such as water vapor does not penetrate therethrough. The heat-resistant polymer layer is preferably water repellent. Water does not reside at the water repellent heat-resistant polymer layer to prevent the metal plate from corrosion, thereby extremely improving the corrosion resistance of the second separator. The term "water repellent heat-resistant polymer layer" as used herein means such a heat-resistant polymer layer that water does not reside at or adhere to, for example, such that the contact angle of a liquid is 90° or more when the liquid is allowed to contact with the solid-gas interface of the layer to replace it to the solid-liquid interface. Further, because the fuel cell generally works at 80 to 120° C., it is preferred that a polymer material used for the heat-resistant polymer layer has a softening point of 120° C. or more from the viewpoint of the long-term stability.

The heat-resistant polymer layer is preferably made of a polymer material selected from the group consisting of vinyl resins such as polyvinyl butylal (PVB), polyvinyl chloride (PVC), polytetrafluoroethylene (PTFE), polyvinylidene fluoride, aromatic polyamides, polyimides, polycarbonates, polybutylene terephthalate (PBT), polyethylene terephthalate (PET), polyesters, polystyrene, copolymers of styrene and another monomer, polyethylene, polypropylene, polyurethanes, silicone resins, polysulfones, polyethersulfones, rayon, cupra, acetate resins, promix, vinylon, vinylidene resins, acrylic resins and derivatives thereof.

The heat-resistant polymer layer preferably has a multi-layered structure comprising two or more layers. For example, as shown in FIGS. 6(a) and 6(b), the heat-resistant polymer layer may have a two layer structure comprising two heat-resistant polymer layers 921 and 922. In this case, it is preferred from the viewpoint of the corrosion resistance that the heat-resistant polymer layer 921 is made of a polymer material excellent in adhesion to the metal plate and that the heat-resistant polymer layer 922 is made of a polymer material excellent in waterproofness.

A method for disposing the heat-resistant polymer layer is not particularly limited. For example, the heat-resistant polymer layer may be disposed by dissolving a polymer material in an appropriate organic solvent; and dipping a metal plate in the resultant solution, followed by drying. Further, the heat-resistant polymer layer may be disposed by covering a metal plate with a thin polymer film; and heating the thin polymer film to fusion-bond it to the metal plate.

The metal plate used as the base for the second separator preferably has a dense structure. The term "dense structure" as used herein means such a structure that substantially has no through-holes, etc. to cause no crossover of the reaction gas. The metal plate used for the second separator is preferably made of a metal material having high electrical conductivity and vibration resistance. When the second separator is used for an on-vehicle fuel cell for an automobile, it is required to be light in weight so that the metal material for the metal plate is preferably a light metal such as aluminum, titanium, magnesium, etc., or an alloy thereof, more preferably aluminum or an aluminum alloy. The thickness of the metal plate is not particularly limited, and it is preferably 0.5 to 3 mm in the case where the metal plate is used for an on-vehicle fuel cell.

To further improve the corrosion resistance of the second separator, the surfaces of the flow channels may be subjected to an appropriate treatment. When the metal plate in the second separator is made of aluminum or an aluminum alloy, as shown in FIGS. 7(a) and 7(b), it is preferable that an anodized aluminum layer 621 is provided on a flow channel 82, a heat-resistant polymer layer 923 being disposed thereon. In the case where the second separator having the heat-resistant polymer layer and the anodized aluminum layer is used for an on-vehicle fuel cell for an automobile, the anodized aluminum layer is prevented from deteriorating or straining due to water vapor by the heat-resistant polymer layer though it is placed under the circumstances of variable temperature and humidity.

The anodized aluminum layer in the second separator may be disposed in the same manner as that in the first separator. It is preferred that the anodized aluminum layer in the second separator is a porous anodized aluminum layer to improve the adherence of the heat-resistant polymer layer thereto. In such a case, the porosity of the porous anodized aluminum layer is preferably 5% or more, more preferably 10% or more. Further, the thickness of the porous anodized aluminum layer is preferably 5 to 50 $\mu$m, more preferably 10 to 30 $\mu$m, from the viewpoint of the corrosion resistance.

In the second separator of the present invention, as shown in FIGS. 8(a) and 8(b), it is also preferable that an anodized aluminum layer 62 is composed of a dense anodized aluminum layer 622 having a porosity of less than 5% and a porous anodized aluminum layer 623 having a porosity of 5% or more, and the heat-resistant polymer layer 924 is disposed thereon, to improve both of the corrosion resistant and the adherence. In such a case, the porous anodized aluminum layer particularly preferably has a porosity of 20% or more. The dense anodized aluminum layer preferably has a thickness of 2 to 30 $\mu$m, and the porous anodized aluminum layer preferably has a thickness of 5 to 50 $\mu$m.

The purity of aluminum composing the second separator of the present invention is preferably 99.5% or more, more preferably 99.9% or more, as is equal to the case of the first separator.

As described above, a conductive film is preferably disposed on each of the contact faces that come into contact with electrodes or collectors. Thus, the whole surface of the second separator according to the present invention is preferably covered with the combination of the heat-resistant polymer layer and the conductive film That is to say, it is preferable that only portions that come into contact with the electrodes are covered with a noble metal, etc. having a high electric conductivity, and the chemically and physically stable heat-resistant polymer layer is disposed on each of the flow channels, thereby improving the corrosion resistance and the electric conductivity of the second separator. A material used for the conductive film of the second separator may be the same as that of the above-mentioned first separator. The preferred embodiments of the forming method and the thickness of the conductive film used in the second separator are also the same as those of the conductive film used in the first separator.

EXAMPLES

The present invention will be described in more detail referring to examples below without intention of restricting the scope of the invention thereto.

Example 1

An aluminum metal plate of 1 mm×150 mm×150 mm in size having a purity of 99.6% was press-worked to form flow channels having a depth of 1.0 mm and a width of 3.0 mm thereon, so that a separator base was prepared. This separator base was anodized in an oxalic acid aqueous solution, immersed in boiling water for 30 minutes, and dried to dispose an anodized aluminum layer having a thickness of 12 μm thereon. Then, electrode contact faces of the anodized separator base were lapped and washed, to improve the flatness thereof and remove the anodized aluminum layer thereon. Subsequently, each of the electrode contact faces was sputtered with Au at a separator base temperature of 200° C. under pure argon gas of 5 mTorr to dispose a conductive film having a thickness of approximately 1 μm, so that a separator was produced.

To 100 parts by weight of carbon black was added 15 parts by weight of a Pt paste (Pt-content: 90 weight %), and to this was further added 15 parts by weight of Teflon particles (average particle size: 0.2 μm) as a water repellent agent, to prepare a paste for electrodes. The paste was applied onto a solid electrolyte membrane of a proton conductive polymer (Nafion) and dried. This was put between carbon cloths, and further sandwiched between two separators mentioned above, to produce a fuel cell 1a using first separators according to the present invention. Incidentally, the separators were compressed in a stacking direction under a surface pressure of 10 kg/cm².

Comparative fuel cells 1b and 1c were produced in the same manner as the fuel cell 1a except for using graphite separators or stainless separators (SUS304), respectively. Further, a comparative fuel cell 1d was produced in the same manner as the fuel cell 1a except for disposing no anodized aluminum layer on the separator base. Incidentally, on each of electrode contact faces of the separators used in the comparative fuel cells 1c and 1d were disposed conductive films of Au, similarly to the fuel cell 1a.

To each of the resulting fuel cells 1a to 1d was supplied a humidified, simulated fuel gas containing 70 volume % of $H_2$, 15 volume % of $CO_2$ and 15 volume % of $H_2O$ through the flow channels on the anode side, and supplied air as an oxidizing agent through the flow channels on the cathode side, so that each of the fuel cells 1a to 1d was evaluated with respect to the stability of electric generation. Material used for separator, initial electric generation voltage, electric generation voltage after working for 10 days, and condition of separator after working for 10 days of each fuel cell were shown in Table 1.

TABLE 1

| Fuel cell | Material used for separator | Initial electric generation voltage (V) | Electric generation voltage after working for 10 days (V) | Condition of separator after working for 10 days |
|---|---|---|---|---|
| 1a | Aluminum (with anodized aluminum layer) | 0.84 | 0.80 | a* |
| 1b | Graphite | 0.85 | 0.83 | — |
| 1c | SUS304 | 0.80 | 0.68 | c* |
| 1d | Aluminum (without anodized aluminum layer) | 0.80 | 0.20 | d* | a*: Corrosion was not observed.
c*: Corrosion was observed in part of flow channels.
d*: Corrosion was observed in whole surface of flow channels.

As shown in Table 1, the first separator of the present invention having the anodized aluminum layer was excellent in the corrosion resistance, whereby the fuel cell 1a using the first separator exhibited high stability of electric generation.

Example 2

Fuel cells 2a to 2s using the first separators of the present invention were produced in the same manner as the above-mentioned fuel cell 1a except for using materials shown in Table 2 instead of Au for the conductive film, respectively. Here, the conductive films of the fuel cells 2q and 2r were each disposed by sputtering carbon (fuel cell 2q) or conductive carbide SiC (fuel cell 2r) to the electrode contact faces under argon gas of 30 mTorr while using a target thereof.

To each of the fuel cells 2a to 2s using the first separators of the present invention and above-mentioned comparative fuel cell 1b was supplied a humidified, simulated fuel gas containing 70 volume % of $H_2$, 20 volume % of $CO_2$ and 10 volume % of $H_2O$ through the flow channels on the anode side, and supplied air as an oxidizing agent through the flow channels on the cathode side, so that each of the fuel cells 2a to 2s and 1b was evaluated with respect to the stability of electric generation. Material used for conductive film, initial electric generation voltage, electric generation voltage after working for 10 days, and condition of separator after working for 10 days of each fuel cell were shown in Table 2.

TABLE 2

| Fuel cell | Material used for conductive film | Initial electric generation voltage (V) | Electric generation voltage after working for 10 days (V) | Condition of separator after working for 10 days |
|---|---|---|---|---|
| 2a | Pt | 0.78 | 0.77 | a* |
| 2b | Au | 0.82 | 0.81 | a* |
| 2c | Pd | 0.77 | 0.75 | a* |
| 2d | Ru | 0.71 | 0.69 | a* |
| 2e | Rh | 0.75 | 0.71 | a* |
| 2f | Ir | 0.79 | 0.78 | a* |
| 2g | Ag | 0.77 | 0.71 | a* |
| 2h | Pt—Au (10 weight %) | 0.78 | 0.77 | a* |
| 2i | Pt—Pd (10 weight %) | 0.78 | 0.74 | a* |
| 2j | Pt—Ru (5 weight %) | 0.76 | 0.73 | a* |

TABLE 2-continued

| Fuel cell | Material used for conductive film | Initial electric generation voltage (V) | Electric generation voltage after working for 10 days (V) | Condition of separator after working for 10 days |
|---|---|---|---|---|
| 2k | Pt—Rh (5 weight %) | 0.75 | 0.72 | a* |
| 2l | Pt—Ir (30 weight %) | 0.79 | 0.75 | a* |
| 2m | Au—Pd (30 weight %) | 0.75 | 0.74 | a* |
| 2n | Au—Ir (30 weight %) | 0.69 | 0.66 | a* |
| 2o | Au—Ag (50 weight %) | 0.74 | 0.71 | a* |
| 2p | Pd—Ag (50 weight %) | 0.76 | 0.70 | a* |
| 2q | Carbon | 0.82 | 0.81 | a* |
| 2r | SiC | 0.84 | 0.83 | a* |
| 2s | Al | 0.47 | 0.21 | d* |
| 1b | — | 0.84 | 0.83 | — | a*: Corrosion was not observed.
d*: Corrosion was observed in whole surface of flow channels.

As shown in Table 2, the first separators of the present invention each having an above-described, preferred conductive film were further excellent in the corrosion resistance, whereby the fuel cells 2a to 2r using the first separators exhibited higher stability of electric generation.

Example 3

Fuel cells 3a to 3j using the first separators of the present invention were produced in the same manner as the above-mentioned fuel cell 1a except that the porosity of the anodized aluminum layer was changed as shown in Table 3 by controlling conditions for disposing the anodized aluminum layer, respectively. Each of the fuel cells 3a to 3j was evaluated with respect to the stability of electric generation in the same manner as Example 2. Porosity of anodized aluminum layer, initial electric generation voltage, electric generation voltage after working for 10 days, and condition of separator after working for 10 days of each fuel cell were shown in Table 3.

TABLE 3

| Fuel cell | Porosity of anodized aluminum layer (%) | Initial electric generation voltage (V) | Electric generation voltage after working for 10 days (V) | Condition of separator after working for 10 days |
|---|---|---|---|---|
| 3a | 0.86 | 0.81 | 0.83 | a* |
| 3b | 1.25 | 0.82 | 0.81 | a* |
| 3c | 1.63 | 0.86 | 0.84 | a* |
| 3d | 2.01 | 0.83 | 0.81 | a* |
| 3e | 2.67 | 0.79 | 0.75 | b* |
| 3f | 3.02 | 0.84 | 0.78 | b* |
| 3g | 3.54 | 0.85 | 0.75 | b* |
| 3h | 5.06 | 0.88 | 0.73 | b* |
| 3i | 7.32 | 0.81 | 0.63 | c* |
| 3j | 10.55 | 0.86 | 0.59 | c* | a*: Corrosion was not observed.
b*: Corrosion was scarcely observed.
c*: Corrosion was observed in part of flow channels.

As shown in Table 3, according to Example 3, the porosity of the anodized aluminum layer contained in the first separator of the present invention was preferably 5.06% or less, more preferably 2.01% or less.

Example 4

Fuel cells 4a to 4j using the first separators of the present invention were produced in the same manner as the above-mentioned fuel cell 1a except that the thickness of the anodized aluminum layer was changed as shown in Table 4 by controlling time for disposing the anodized aluminum layer, respectively. Incidentally, the anodized aluminum layer of each first separator had a porosity of approximately 1.25%. Each of the fuel cells 4a to 4j was evaluated with respect to the stability of electric generation in the same manner as Example 2. Thickness of anodized aluminum layer, initial electric generation voltage, electric generation voltage after working for 10 days, and condition of separator after working for 10 days of each fuel cell were shown in Table 4.

TABLE 4

| Fuel cell | Thickness of anodized aluminum layer (μm) | Initial electric generation voltage (V) | Electric generation voltage after working for 10 days (V) | Condition of separator after working for 10 days |
|---|---|---|---|---|
| 4a | 3.5 | 0.86 | 0.71 | c* |
| 4b | 4.8 | 0.83 | 0.81 | b* |
| 4c | 9.7 | 0.82 | 0.84 | a* |
| 4d | 15.8 | 0.85 | 0.81 | a* |
| 4e | 26.7 | 0.88 | 0.86 | a* |
| 4f | 33.1 | 0.81 | 0.78 | a* |
| 4g | 51.5 | 0.81 | 0.76 | b* |
| 4h | 69.1 | 0.85 | 0.69 | c* |
| 4i | 78.3 | 0.88 | 0.63 | c* |
| 4j | 94.6 | 0.86 | 0.56 | c* | a*: Corrosion was not observed.
b*: Corrosion was scarcely observed.
c*: Corrosion was observed in part of flow channels.

As shown in Table 4, according to Example 4, the thickness of the anodized aluminum layer contained in the first separator of the present invention was preferably 4.8 to 51.5 μm, more preferably 9.7 to 33.1 μm.

Example 5

Fuel cells 5a to 5g using the first separators of the present invention were produced in the same manner as the above-mentioned fuel cell 1a except that the porosity of the anodized aluminum layer was stepwise changed by controlling anodizing conditions to dispose the anodized aluminum layer composed of a dense anodized aluminum layer and a porous anodized aluminum layer having a porosity shown in Table 5 provided thereon, respectively. Incidentally, the dense anodized aluminum layer had a thickness of 15 μm and a porosity of 1.25%, and the porous anodized aluminum layer had a thickness of approximately 10 to 30 μm. Each of the fuel cells 5a to 5g was evaluated with respect to the stability of electric generation in the same manner as Example 2. Porosity of porous anodized aluminum layer, initial electric generation voltage, electric generation voltage after working for 36 days, and condition of separator after working for 36 days of each fuel cell were shown in Table 5.

TABLE 5

| Fuel cell | Porosity of porous anodized aluminum layer (%) | Initial electric generation voltage (V) | Electric generation voltage after working for 36 days (V) | Condition of separator after working for 36 days |
|---|---|---|---|---|
| 5a | 5.6 | 0.79 | 0.67 | c* |
| 5b | 9.4 | 0.82 | 0.78 | b* |
| 5c | 19.4 | 0.86 | 0.83 | a* |
| 5d | 26.1 | 0.85 | 0.82 | a* |
| 5e | 36.7 | 0.84 | 0.82 | a* |
| 5f | 39.4 | 0.80 | 0.77 | a* |
| 5g | 46.2 | 0.83 | 0.79 | a* | a*: Corrosion was not observed.
b*: Corrosion was scarcely observed.
c*: Corrosion was observed in part of flow channels.

As shown in Table 5, according to Example 5, the porosity of the porous anodized aluminum layer was preferably 9.4% or more, more preferably 19.4% o more in the case where the anodized aluminum layer of the first separator was composed of the dense anodized aluminum layer and the porous anodized aluminum layer. In the separators used for the fuel cells 5a and 5b, corrosion was generated around crack of the anodized aluminum layer.

Example 6

Fuel cells 6a to 6g using the first separators of the present invention were produced in the same manner as the above-mentioned fuel cell 1a except that a corner portion formed between surfaces of the flow channel was shaped into a curved surface having a curvature radius shown in Table 6, respectively. Incidentally, the anodized aluminum layer had a thickness of approximately 15 μm and a porosity of 1.25%. Each of the fuel cells 6a to 6g was evaluated with respect to the stability of electric generation in the same manner as Example 2. The above curvature radius of the corner portion formed between surfaces of the flow channel, and condition of separator after working for 34 days of each fuel cell were shown in Table 6.

TABLE 6

| Fuel cell | Curvature radius of corner portion formed between surfaces of flow channel (mm) | Condition of separator after working for 34 days |
|---|---|---|
| 6a | 0.1 | c* |
| 6b | 0.2 | c* |
| 6c | 0.3 | c* |
| 6d | 0.5 | b* |
| 6e | 0.7 | b* |
| 6f | 1.0 | a* |
| 6g | 1.5 | a* | a*: Corrosion was not observed.
b*: Corrosion was scarcely observed.
c*: Corrosion was observed in part of flow channels.

As shown in Table 6, according to Example 6, the above-described curvature radius of the corner portion formed between surfaces of the flow channel in the first separator was preferably 0.5 mm or more, more preferably 1.0 mm or more. In the separators used for the fuel cells 6a to 6c, corrosion was generated around crack of the anodized aluminum layer, which was mainly formed at the corner portion formed between surfaces of the flow channel.

Example 7

Fuel cells 7a to 7g using the first separators of the present invention were produced in the same manner as the above-mentioned fuel cell 1a except that a corner portion formed between a side surface of the flow channel and the contact face was shaped into a curved surface having a curvature radius shown in Table 7, respectively. Incidentally, a corner portion formed between surfaces of the flow channel was shaped into a curved surface having a curvature radius of 1.0 mm. Further, the anodized aluminum layer had a thickness of approximately 15 μm and a porosity of 1.25%. Each of the fuel cells 7a to 7g was evaluated with respect to the stability of electric generation in the same manner as Example 2. Curvature radius of the corner portion formed between the side surface of the flow channel and the contact face, initial electric generation voltage, electric generation voltage after working for 34 days, and condition of separator after working for 34 days of each fuel cell were shown in Table 7.

TABLE 7

| Fuel cell | Curvature radius of corner portion formed between side surface of flow channel and contact face (mm) | Initial electric generation voltage (V) | Electric generation voltage after working for 34 days (V) | Condition of separator after working for 34 days |
|---|---|---|---|---|
| 7a | 0.1 | 0.80 | 0.67 | c* |
| 7b | 0.2 | 0.81 | 0.72 | c* |
| 7c | 0.3 | 0.80 | 0.78 | b* |
| 7d | 0.5 | 0.78 | 0.70 | a* |
| 7e | 0.7 | 0.83 | 0.81 | a* |
| 7f | 1.0 | 0.80 | 0.78 | a* |
| 7g | 1.5 | 0.82 | 0.79 | a* | a*: Corrosion was not observed.
b*: Corrosion was scarcely observed.
c*: Corrosion was observed in part of flow channels.

As shown in Table 7, according to Example 7, the above-described curvature radius of the corner portion formed between the side surface of the flow channel and the contact face in the first separator was preferably 0.3 mm or is more, more preferably 0.5 mm or more. In the separators used for the fuel cells 7a and 7b, corrosion was generated around crack of the anodized aluminum layer, which was mainly formed at the corner portion formed between the side surface of the flow channel and the contact face.

Example 8

Fuel cells 8a to 8f fusing the first separators of the present invention were produced in the same manner as the above-mentioned fuel cell 1a except for changing the purity of the aluminum metal plate as shown in Table 8, respectively. Each of the fuel cells 8a to 8f was evaluated with respect to the stability of electric generation in the same manner as Example 1. Purity of aluminum metal plate, initial electric generation voltage, electric generation voltage after working for 12 days, and condition of separator after working for 12 days of each fuel cell were shown in Table 8.

TABLE 8

| Fuel cell | Purity of aluminum metal plate (%) | Initial electric generation voltage (V) | Electric generation voltage after working for 12 days (V) | Condition of separator after working for 12 days |
|---|---|---|---|---|
| 8a | 99.23 | 0.78 | 0.63 | c* |
| 8b | 99.50 | 0.81 | 0.74 | b* |
| 8c | 99.76 | 0.79 | 0.74 | b* |

TABLE 8-continued

| Fuel cell | Purity of aluminum metal plate (%) | Initial electric generation voltage (V) | Electric generation voltage after working for 12 days (V) | Condition of separator after working for 12 days |
|---|---|---|---|---|
| 8d | 99.90 | 0.78 | 0.77 | a* |
| 8e | 99.97 | 0.83 | 0.81 | a* |
| 8f | 99.99 | 0.85 | 0.83 | a* | a*: Corrosion was not observed.
b*: Corrosion was scarcely observed.
c*: Corrosion was observed in part of flow channels.

As shown in Table 8, according to Example 8, the purity of the aluminum metal plate used for the first separator of the present invention was preferably 99.50% or more, more preferably 99.90% or more.

Example 9

A metal plate of 1 mm×150 mm×150 mm in size made of aluminum was press-worked to form flow channels having a depth of 1.0 mm and a width of 3.0 mm thereon, so that a separator base was prepared. This separator base was dipped in a solution prepared by dissolving 15 parts by weight of a polyvinyl butylal (PVB) powder in 100 parts by weight of butyl acetate, and subjected to a curing treatment at approximately 150° C., to dispose a heat-resistant polymer layer on the entire separator base. Then, electrode contact faces of the resultant separator base were lapped and washed, to remove the heat-resistant polymer layer of PVB thereon. Subsequently, a conductive film of Au was disposed on each of the electrode contact faces in the same manner as Example 1, to produce a separator. A fuel cell 9a using thus-obtained second separator was produced in the same manner as Example 1.

Fuel cells 9b to 9d using the second separators of the present invention were produced in the same manner as the fuel cell 9a except for using materials shown in Table 9 instead of aluminum for the separator base, respectively.

Comparative fuel cells 9e to 9h were produced in the same manner as the fuel cells 9a to 9d except that the heat-resistant polymer layer was not disposed, respectively. Further, a comparative fuel cell 9i was produced in the same manner as the comparative fuel cell 9e except for using graphite instead of aluminum for the separator base.

Each of the fuel cells 9a to 9d using a second separator of the present invention and the comparative fuel cells 9e to 9i was evaluated with respect to the stability of electric generation in the same manner as Example 1. Material for separator base, polymer used for heat-resistant polymer layer, initial electric generation voltage, electric generation voltage after working for 13 days, and condition of the separator after working for 13 days of each fuel cell were shown in Table 9.

TABLE 9

| Fuel cell | Material for separator base | Polymer used for heat-resistant polymer layer | Initial electric generation voltage (V) | Electric generation voltage after working for 13 days (V) | Condition of separator after working for 13 days |
|---|---|---|---|---|---|
| 9a | Aluminum | PVB | 0.82 | 0.75 | a* |
| 9b | Titanium | PVB | 0.79 | 0.75 | a* |
| 9c | Stainless Steel (SUS304) | PVB | 0.78 | 0.72 | a* |
| 9d | Carbon Steel (S45CM) | PVB | 0.79 | 0.71 | a* |
| 9e | Aluminum | — | 0.80 | 0.35 | d* |
| 9f | Titanium | — | 0.81 | 0.56 | c* |
| 9g | Stainless Steel (SUS304) | — | 0.78 | 0.61 | c* |
| 9h | Carbon Steel (S45CM) | — | 0.77 | 0.39 | d* |
| 9i | Graphite | — | 0.81 | 0.80 | — | a*: Corrosion was not observed.
c*: Corrosion was observed in part of flow channels.
d*: Corrosion was observed in whole surface of flow channels.

As shown in Table 9, the second separators of the present invention having the heat-resistant polymer layer were excellent in the corrosion resistance, whereby the fuel cells 9a to 9d using the second separator exhibited high stability of electric generation.

Example 10

Fuel cells 10a to 10r using the second separators of the present invention were produced in the same manner as the above-mentioned fuel cell 9a except for using materials shown in Table 10 instead of Au for the conductive film, respectively. Further, a fuel cell 10s was produced in the same manner as the above-mentioned fuel cell 9a except that the conductive film was not disposed. However, the conductive films of the fuel cells 10q and 10r were each disposed by sputtering carbon (fuel cell 10q) or conductive carbide SiC (fuel cell 10r) to the electrode contact faces under argon gas of 30 mTorr while using a target thereof. Each of the fuel cells 10a to 10s and the above-mentioned comparative fuel cell 9i was evaluated with respect to the stability of electric generation in the same manner as Example 2. Material for conductive film, initial electric generation voltage, electric generation voltage after working for 12 days, and condition of separator after working for 12 days of each fuel cell were shown in Table 10.

TABLE 10

| Fuel cell | Material for conductive film | Initial electric generation voltage (V) | Electric generation voltage after working for 12 days (V) | Condition of separator after working for 12 days |
|---|---|---|---|---|
| 10a | Pt | 0.80 | 0.78 | a* |
| 10b | Au | 0.83 | 0.81 | a* |
| 10c | Pd | 0.79 | 0.76 | a* |
| 10d | Ru | 0.74 | 0.68 | a* |
| 10e | Rh | 0.75 | 0.72 | a* |
| 10f | Ir | 0.79 | 0.77 | a* |
| 10g | Ag | 0.78 | 0.73 | a* |
| 10h | Pt—Au (10 weight %) | 0.78 | 0.76 | a* |
| 10i | Pt—Pd (10 weight %) | 0.79 | 0.74 | a* |

TABLE 10-continued

| Fuel cell | Material for conductive film | Initial electric generation voltage (V) | Electric generation voltage after working for 12 days (V) | Condition of separator after working for 12 days |
|---|---|---|---|---|
| 10j | Pt—Ru (5 weight %) | 0.77 | 0.72 | a* |
| 10k | Pt—Rh (5 weight %) | 0.76 | 0.72 | a* |
| 10l | Pt—Ir (30 weight %) | 0.78 | 0.74 | a* |
| 10m | Au—Pd (30 weight %) | 0.76 | 0.73 | a* |
| 10n | Au—Ir (30 weight %) | 0.68 | 0.62 | a* |
| 10o | Au—Ag (50 weight %) | 0.72 | 0.70 | a* |
| 10p | Pd—Ag (50 weight %) | 0.75 | 0.71 | a* |
| 10q | Carbon | 0.83 | 0.81 | a* |
| 10r | SiC | 0.81 | 0.78 | a* |
| 10s | — | 0.80 | 0.51 | c* |
| 9i | Au | 0.82 | 0.81 | — | a*: Corrosion was not observed.
c*: Corrosion was observed in contact faces.

As shown in Table 10, the second separators of the present invention each having an above-described, preferred conductive film were further excellent in the corrosion resistance, whereby the fuel cells 10a to 10r using the second separators exhibited higher stability of electric generation.

Example 11

Fuel cells 11a to 11i using the separators of the present invention were produced in the same manner as the above-mentioned fuel cell 9a except that an anodized aluminum layer having a porosity shown in Table 11 was provided on each flow channel, and that the heat-resistant polymer layer of PVB was disposed on the anodized aluminum layer, respectively. Incidentally, the anodized aluminum layer was disposed in the same manner as Example 1, however, the thickness thereof was 15 μm. Further, fuel cells 11j to 11r using the first separators of the present invention were produced in the same manner as the fuel cells 11a to 11i except that the heat-resistant polymer layer was not disposed, respectively.

Each of the fuel cells 11a to 11i using the separators of the present invention having the anodized aluminum layer and the heat-resistant polymer layer, the fuel cells 11j to 11r using the first separators of the present invention having the anodized aluminum layer, and the fuel cell 9a using the second separator of the present invention having the heat-resistant polymer layer was evaluated with respect to the stability of electric generation in the same manner as Example 2. Porosity of anodized aluminum layer, initial electric generation voltage, electric generation voltage after working for 48 days, and whether the anodized aluminum layer was peeled off or not after working for 48 days of each fuel cell were shown in Table 11.

TABLE 11

| Fuel cell | Porosity of anodized aluminum layer (%) | Initial electric generation voltage (V) | Electric generation voltage after working for 48 days (V) | Anodized aluminum layer after working for 48 days |
|---|---|---|---|---|
| 11a | 1.17 | 0.81 | 0.67 | Partly peeled off |
| 11b | 2.19 | 0.78 | 0.65 | Partly peeled off |
| 11c | 3.56 | 0.81 | 0.68 | Partly peeled off |
| 11d | 4.82 | 0.79 | 0.74 | Scarcely peeled off |
| 11e | 6.67 | 0.79 | 0.73 | Scarcely peeled off |
| 11f | 7.40 | 0.83 | 0.78 | Scarcely peeled off |
| 11g | 9.84 | 0.81 | 0.77 | Not peeled off |
| 11h | 15.7 | 0.76 | 0.72 | Not peeled off |
| 11i | 25.3 | 0.80 | 0.76 | Not peeled off |
| 11j | 1.17 | 0.79 | 0.52 | Peeled off |
| 11k | 2.19 | 0.78 | 0.54 | Peeled off |
| 11l | 3.56 | 0.81 | 0.61 | Partly peeled off |
| 11m | 4.82 | 0.76 | 0.60 | Partly peeled off |
| 11n | 6.67 | 0.79 | 0.63 | Partly peeled off |
| 11o | 7.40 | 0.83 | 0.34 | —(c*) |
| 11p | 9.84 | 0.79 | 0.42 | —(c*) |
| 11q | 15.7 | 0.82 | 0.26 | —(c*) |
| 11r | 25.3 | 0.80 | 0.37 | —(c*) |
| 9a | — | 0.82 | 0.56 | — | c*: Corrosion was observed in part of flow channels.

As shown in Table 11, the fuel cells 11a to 11i using the separators of the present invention where the heat-resistant polymer layer was disposed on the anodized aluminum layer was higher in the stability of electric generation than the fuel cells 11j to 11r using the first separators having only the anodized aluminum layer and the fuel cell 9a using the second separator having only the heat-resistant polymer layer. The heat-resistant polymer layer prevented the anodized aluminum layer from peeling off or corroding in each separator used for the fuel cells 11a to 11i. Further, according to this Example 11, the porosity of the anodized aluminum layer provided between the aluminum metal plate and the heat-resistant polymer layer was preferably 4.82% or more, more preferably 9.84% or more.

Example 12

Fuel cells 12a to 12w using the second separators of the present invention were produced in the same manner as the above-mentioned fuel cell 9a except for using polymers shown in Table 12 instead of PVB for the heat-resistant polymer layer, respectively. However, the heat-resistant polymer layer of each separator was disposed by a method, which was properly selected from solution-coating methods and thermal fusion bonding methods depending on the polymer used therefor.

Each of the fuel cells 12a to 12w using the second separators of the present invention was evaluated with respect to the stability of electric generation in the same manner as Example 10. Polymer used for heat-resistant polymer layer, initial electric generation voltage, electric generation voltage after working for 12 days, and condition of separator after working for 12 days of each fuel cell were shown in Table 12.

TABLE 12

| Fuel cell | Polymer used for heat-resistant polymer layer | Initial electric generation voltage (V) | Electric generation voltage after working for 12 days (V) | Condition of separator after working for 12 days |
|---|---|---|---|---|
| 12a | Polyvinyl butylal (PVB) | 0.83 | 0.80 | a* |
| 12b | Polycapramide | 0.80 | 0.78 | a* |

TABLE 12-continued

| Fuel cell | Polymer used for heat-resistant polymer layer | Initial electric generation voltage (V) | Electric generation voltage after working for 12 days (V) | Condition of separator after working for 12 days |
|---|---|---|---|---|
| 12c | Trimellitic anhydride/maleic anhydride bis(aminophenyl) methane copolymer | 0.79 | 0.78 | a* |
| 12d | Polytetrafluoroethylene (PTFE) | 0.80 | 0.79 | a* |
| 12e | Polyvinylidene fluoride | 0.82 | 0.80 | a* |
| 12f | Polyalkylene(C2-4) carbonate | 0.83 | 0.80 | a* |
| 12g | Polybutylene terephthalate (PBT) | 0.80 | 0.78 | a* |
| 12h | Polyethylene terephthalate (PET) | 0.79 | 0.78 | a* |
| 12i | Polyethylene | 0.83 | 0.81 | a* |
| 12j | Chlorinated product of styrene/divinylbenzene copolymer | 0.82 | 0.79 | a* |
| 12k | Polypropylene | 0.81 | 0.78 | a* |
| 12l | N-Methyl-N-(vinylbenzyl)piperidinium chloride/styrene/divinylbenzene copolymer | 0.79 | 0.76 | a* |
| 12m | 1,1'-(Ethylimino)-di-2-propanol/bis(4-isocyanatocyclohexyl) methane polyaddition product | 0.83 | 0.81 | a* |
| 12n | Silicone resin | 0.82 | 0.79 | a* |
| 12o | Polysulfone | 0.83 | 0.81 | a* |
| 12p | Polyethersulfone | 0.80 | 0.78 | a* |
| 12q | Viscose rayon | 0.79 | 0.77 | a* |
| 12r | Cupra | 0.83 | 0.82 | a* |
| 12s | Acetate resin | 0.79 | 0.76 | a* |
| 12t | Promix | 0.83 | 0.82 | a* |
| 12u | Vinyl chloride/vinylidene chloride copolymer | 0.82 | 0.80 | a* |
| 12v | Polyvinyl chloride (PVC) | 0.81 | 0.78 | a* |
| 12w | Styrene/α-methylstyrene/acrylic acid copolymer | 0.84 | 0.82 | a* | a*: Corrosion was not observed.

As shown in Table 12, the second separators of the present invention having an above-described, preferred heat-resistant polymer layer were further excellent in the corrosion resistance, whereby the fuel cells 12a to 12w using the second separators exhibited higher stability of electric generation.

As described in detail above, a bipolar current collector separator of the present invention is composed of a metal plate, to be high in mass-productivity and to be produced with a reduced cost. A first separator of the present invention is mainly composed of aluminum and partly has an anodized aluminum layer, thereby being remarkably light in weight and excellent in corrosion resistance. A second separator of the present invention partly has a heat-resistant polymer layer, thereby being excellent in corrosion resistance. A fuel cell using the bipolar current collector separator of the present invention exhibits high stability of electric generation.

What is claimed is:

1. A bipolar current collector separator for a fuel cell composed of a metal plate having flow channels and contact faces that come into contact with an electrode or a collector, wherein a corrosion-resistant layer is disposed on each of said flow channels and further wherein:
   said corrosion-resistant layer is an anodized aluminum layer and said metal plate is made of aluminum or an aluminum alloy.

2. The bipolar current collector separator according to claim 1, wherein said anodized aluminum layer is composed of a dense anodized aluminum layer having a porosity of less than 5%.

3. The bipolar current collector separator according to claim 2, wherein said dense anodized aluminum layer has a thickness of 5 to 50 μm.

4. The bipolar current collector separator according to claim 1, wherein said anodized aluminum layer is composed of a dense anodized aluminum layer having a porosity of less than 5%, and a porous anodized aluminum layer having a porosity of 5% or more provided on said dense anodized aluminum layer.

5. The bipolar current collector separator according to claim 1, wherein said aluminum has a purity of 99.5% or more.

6. The bipolar current collector separator according to claim 1, wherein a corner portion formed between surfaces of said flow channel is in the shape of a curved surface having a curvature radius of 0.5 mm or more.

7. The bipolar current collector separator according to claim 1, wherein a corner portion formed between a side surface of said flow channel and said contact face is in the shape of a curved surface having a curvature radius of 0.3 mm or more.

8. The bipolar current collector separator according to claim 1, wherein said anodized aluminum layer is provided on said flow channel, and a heat-resistant polymer layer is disposed on said anodized aluminum layer.

9. The bipolar current collector separator according to claim 8, wherein said anodized aluminum layer is composed of a porous anodized aluminum layer having a porosity of 5% or more.

10. The bipolar current collector separator according to claim 8, wherein said anodized aluminum layer is composed of a dense anodized aluminum layer having a porosity of less than 5%, and a porous anodized aluminum layer having a porosity of 5% or more provided on said dense anodized aluminum layer.

11. The bipolar current collector separator according to claim 1, wherein a conductive film is disposed on one of said contact faces.

12. The bipolar current collector separator according to claim 11, wherein said conductive film is made of a metal selected from the group consisting of Pt, Au, Pd, Ru, Rh, Ir, Ag, mixtures thereof and alloys composed thereof; carbon; or a conductive carbide.

* * * * *